United States Patent
Deen et al.

(10) Patent No.: US 7,403,838 B2
(45) Date of Patent: Jul. 22, 2008

(54) MESSAGING SYSTEM BASED BUILDING CONTROL

(75) Inventors: Damon M. Deen, West Des Moines, IA (US); Tim Chipman, Bothell, WA (US); Richard Snelson, Redmond, WA (US)

(73) Assignee: General Instrument Corporation, Horsham, PA (US)

( * ) Notice: Subject to any disclaimer, the term of this patent is extended or adjusted under 35 U.S.C. 154(b) by 51 days.

(21) Appl. No.: 11/302,777

(22) Filed: Dec. 14, 2005

(65) Prior Publication Data

US 2006/0142880 A1   Jun. 29, 2006

Related U.S. Application Data

(60) Provisional application No. 60/636,496, filed on Dec. 16, 2004.

(51) Int. Cl.
| | |
|---|---|
| G01M 1/38 | (2006.01) |
| G05B 13/00 | (2006.01) |
| G05B 15/00 | (2006.01) |
| G05B 23/00 | (2006.01) |
| G05B 11/01 | (2006.01) |
| G05B 19/18 | (2006.01) |

(52) U.S. Cl. ............................ 700/276; 700/19; 700/65; 700/66; 700/277; 709/217; 709/227; 709/228; 709/229; 715/758; 379/102.01; 379/102.05

(58) Field of Classification Search ......... 700/276–278, 700/2–5, 19–20, 17, 65–66, 83; 379/102.05, 379/102.01; 715/758; 714/759; 340/825.56, 340/5.1, 5.92, 870.01, 870.74; 709/217, 709/227, 228, 229

See application file for complete search history.

(56) References Cited

U.S. PATENT DOCUMENTS

| | | | |
|---|---|---|---|
| 5,086,385 A | 2/1992 | Launey et al. | ................ 364/188 |
| 5,519,878 A | 5/1996 | Dolin, Jr. | ..................... 395/800 |
| 5,570,085 A | 10/1996 | Bertsch | ................. 340/825.07 |
| 5,621,662 A | 4/1997 | Humphries et al. | ......... 364/550 |
| 5,642,101 A | 6/1997 | Stirk et al. | ............. 340/825.08 |
| 5,706,191 A | 1/1998 | Bassett et al. | ................ 364/138 |
| 5,815,086 A | 9/1998 | Ivie et al. | ............... 340/825.52 |
| 5,822,012 A | 10/1998 | Jeon et al. | .................... 348/553 |

(Continued)

OTHER PUBLICATIONS

Zork I Manual, http://infodoc.plover.net/manuals/zork1.pdf, copyright 1984, pp. 1-29.

*Primary Examiner*—Ramesh Patel
(74) *Attorney, Agent, or Firm*—Benjamin D. Driscoll (57) ABSTRACT

An arrangement using an Instant Messaging ("IM") chat-type interface for monitoring and controlling devices in an automated home is provided. The automated home is arranged to be accessible as an IM contact (often called a "buddy") to a user of an IM service that is located remotely from the automated home. After initiating an IM chat session, the user queries the status of systems and devices in the automated home, and operates devices in the automated home. In various illustrative examples, natural language commands are utilized to enable the user to ask simple questions regarding the status of devices in the home, take a virtual "walk through" the home, and turn devices on and off, among other options. As IM interfaces are being increasingly used on a variety of devices including mobile phones and personal digital assistants, users can conveniently access and control their automated home while traveling.

17 Claims, 8 Drawing Sheets

U.S. PATENT DOCUMENTS

| | | | |
|---|---|---|---|
| 5,938,757 A | 8/1999 | Bertsch | 712/36 |
| 6,003,131 A | 12/1999 | Lee et al. | 713/2 |
| 6,021,324 A | 2/2000 | Sizer, II et al. | 455/403 |
| 6,061,602 A | 5/2000 | Meyer | 700/83 |
| 6,243,707 B1 | 6/2001 | Humpleman et al. | 707/102 |
| 6,529,589 B1 | 3/2003 | Nelson et al. | 379/102.01 |
| 6,757,365 B1* | 6/2004 | Bogard | 379/88.17 |
| 6,980,556 B2* | 12/2005 | Vimpari | 370/395.52 |
| 2002/0047774 A1 | 4/2002 | Christensen et al. | 340/3.54 |
| 2003/0028597 A1* | 2/2003 | Salmi et al. | 709/204 |
| 2003/0040812 A1 | 2/2003 | Gonzales et al. | 700/19 |
| 2003/0040819 A1 | 2/2003 | Gonzales et al. | 700/83 |
| 2003/0074088 A1 | 4/2003 | Gonzales et al. | 700/19 |
| 2003/0158902 A1* | 8/2003 | Volach | 709/206 |
| 2003/0185232 A1* | 10/2003 | Moore et al. | 370/465 |
| 2003/0220972 A1* | 11/2003 | Montet et al. | 709/204 |
| 2003/0231619 A1* | 12/2003 | Akturk | 370/352 |
| 2003/0233424 A1* | 12/2003 | Seo | 709/217 |
| 2004/0044755 A1 | 3/2004 | Chipman | 709/223 |
| 2004/0103153 A1* | 5/2004 | Chang et al. | 709/206 |
| 2004/0148632 A1* | 7/2004 | Park et al. | 725/81 |
| 2004/0158630 A1* | 8/2004 | Chang et al. | 709/224 |
| 2005/0021645 A1* | 1/2005 | Kulkami et al. | 709/206 |
| 2005/0108091 A1* | 5/2005 | Sotak et al. | 705/14 |
| 2005/0131551 A1* | 6/2005 | Ruutu et al. | 700/1 |
| 2005/0138546 A1* | 6/2005 | AbiEzzi | 715/513 |
| 2005/0170861 A1* | 8/2005 | Niemi et al. | 455/552.1 |
| 2005/0282526 A1* | 12/2005 | Leppanen et al. | 455/414.1 |
| 2006/0031339 A1* | 2/2006 | Peters | 709/206 |
| 2006/0031367 A1* | 2/2006 | Buford et al. | 709/207 |
| 2006/0052087 A1* | 3/2006 | Tuunanen et al. | 455/414.1 |
| 2006/0133585 A1* | 6/2006 | Daigle et al. | 379/88.06 |
| 2006/0168015 A1* | 7/2006 | Fowler | 709/206 |
| 2006/0168026 A1* | 7/2006 | Keohane et al. | 709/206 |

* cited by examiner

MESSAGING SYSTEM BASED BUILDING CONTROL

CROSS REFERENCE TO RELATED APPLICATION

This application claims the benefit of U.S. Provisional Patent Application Ser. No. 60/636,496, filed Dec. 16, 2004, entitled "Messaging System Based Building Control," which is incorporated by reference herein in its entirety.

BACKGROUND

Home automation systems play an increasingly important role in providing consumers with an ability to monitor and control a wide range of devices in the home including heating units and air conditioners, lighting, sound and entertainment, doors and security cameras, as well as any other system, appliance, or apparatus that can be connected to home network. It is presently possible to control the devices in the home through a centralized interface such as touchpad or computer, and to add additional devices to the system and enable them to be controlled through the centralized interface.

While home automation systems work well in many settings, the centralized control interface is not always sufficient, particularly for those users wanting to control devices from remote locations. Unfortunately, existing remote access schemes provide neither a simple and easy-to-use control interface nor enable remote access to the home from mobile communication devices.

DETAILED DESCRIPTION

An arrangement using an Instant Messaging ("IM") chat-type interface for monitoring and controlling devices in an automated home is provided. The automated home is arranged to be accessible as an IM contact (often called a "buddy") to a user of an IM service that is located remotely from the automated home. After initiating an IM chat session, the user queries the status of systems and devices in the automated home, and operates devices in the automated home.

In various illustrative examples, natural language commands are utilized to enable the user to ask simple questions regarding the status of devices in the home, take a virtual "walk through" the home, and turn devices on and off, among other options. As IM interfaces are being increasingly used on a variety of devices including mobile phones and personal digital assistants, users can conveniently access and control their automated home while traveling.

The present arrangement advantageously enables monitoring and control of devices in the home from remote locations through a user-friendly interface. The automated home is able to monitor the presence and state of devices in the home and report on the presence (or absence) and state of those devices in an entirely automated fashion using IM, and without requiring user action.

Figure 1:
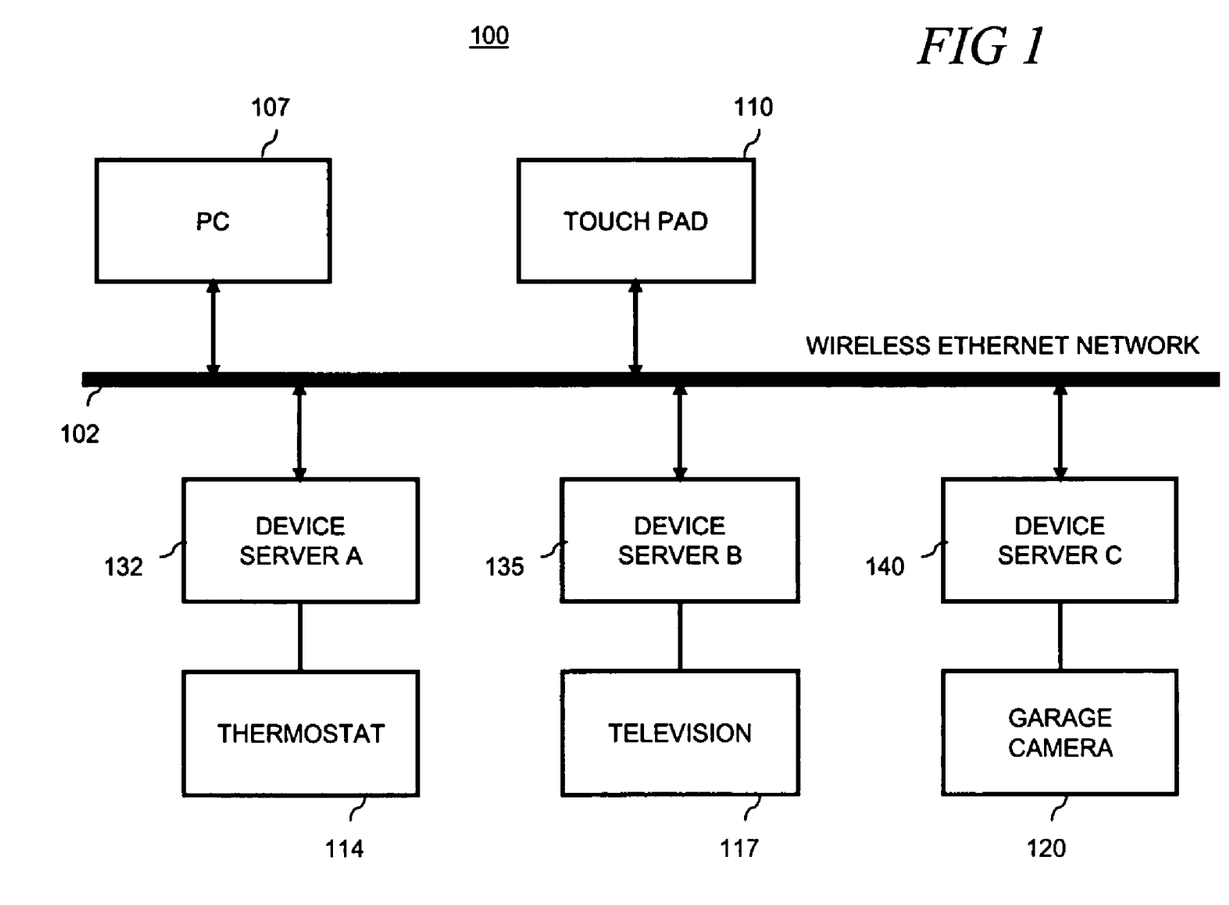
FIG. 1 is a diagram of an illustrative home automation network architecture.

FIG. 1 is a diagram of an illustrative home automation network architecture 100. A home automation network 102 is utilized to operatively connect a variety of devices that are representative of those in common use in an automated home. The term "automated home" as used herein means a home that taps into the various household networks to provide useful services through central monitoring and control of the connected devices. Home automation promises greater convenience, time savings, and personal security and comfort for users. Automated homes are sometimes referred to as "intelligent homes" or "smart homes."

A few examples of services enabled by home automation technology include: a home entertainment system playing a person's favorite music and responding to their voice commands; lighting and heating/ventilation/air conditioning ("HVAC") automatically adjusting depending on time of day and whether anyone is currently at home; kitchen appliances such as the oven and coffee maker activating in advance of a person waking up in the morning or returning home; and a home personal computer ("PC") automatically sending email to the office, or the telephone system calling a mobile phone number should a home emergency (such as a water leak or power failure) occur.

In this illustrative arrangement, the home automation network 102 is arranged as a wireless Ethernet network using the known TCP/IP protocol suite ("Transmission Control Protocol/Internet Protocol"). In such an arrangement, each device on the network has a unique address, commonly called an "IP address." An IP address consists of four numbers separated by a dot '.' where each number is in the range 0–255. For example, an IP address for a device on home automation network 102 could be 192.36.253.80.

In addition to wireless Ethernet, any of the other commonly available networks used in a typical home or office are also useable with the present arrangement, depending on the requirements of a specific application. Illustrative examples of such networks are listed at the end of this description.

The devices connected to the home automation network 102 include PC 107, touch pad 110, thermostat 114, television 117 and garage camera 120. It is emphasized that these particular devices are merely illustrative and others are also useable with the present arrangement, several of which are listed as examples at the end of this description.

PC 107 typically functions as the centralized home automation controller and accordingly is arranged to monitor operational states of, and provide operating commands to, the devices coupled to it through the home automation network 102. Touchpad 110 is also commonly used to manage automated home functions from a central location. In alternative arrangements, sufficient "intelligence" is often embodied into the various devices coupled to the network so that centralized control is not necessary to implement some desired features and functions. For example, in one application of messaging based building control, a user may wish to query the status of a device using an IM message that is sent directly to a particular device (e.g., television 117) without using PC 107 as an intermediary.

PC 107 is representative of any of a variety of devices that enables external network access to a home or office. PC 107 thus provides the home automation network 102 with the capability to communicate outside the home using IM. PC 107 accordingly may be selected, for example, from one of personal computer, network server, gateway, router, laptop computer and set top box.

Figure 2:
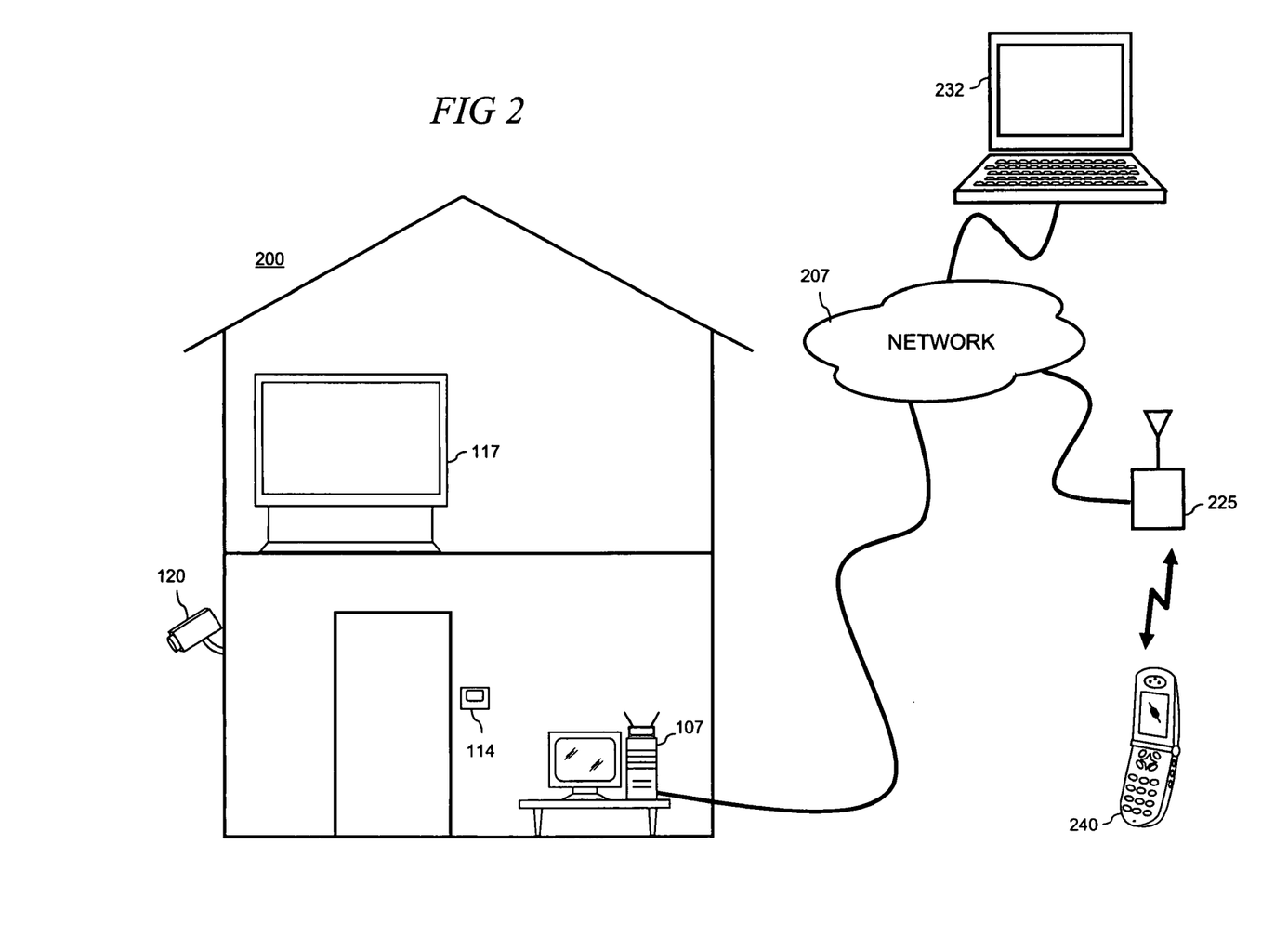
FIG. 2 is a diagram of an illustrative arrangement in which an automated home is coupled to a communications network.

PC 107 is typically arranged in most applications as a gateway to an external communications network (where one such external network is shown in FIG. 2 below and described in the accompanying text). PC 107 performs a number of common networking tasks in such arrangement, including functioning as a firewall and as router having two IP addresses: one having relevance to the home automation network 102 and one for its use with the external communications network.

PC 107 may also provide a DNS server (domain name server) function to the home automation network 102. A DNS server is a name server that is used to associate and remember given names to corresponding IP addresses. For example, the garage camera 120 used to monitor a garage door is more easily remembered and accessed by the word "garage cam" than it is by its IP address, e.g. 192.36.253.80.

Thermostat 114, television 117 and garage camera 120 are coupled indirectly to home automation network 102 in this illustrative arrangement. Disposed between the devices and the network are devices servers A, B and C (respectively indicated by reference numerals 132, 135 and 140 in FIG. 1). Such device servers are optionally used to store and serve software objects that are used to represent devices on the home automation network 102 in an abstract manner to PC 107. That is, PC 107 retrieves data associated with a device but in a format that is not device-specific.

Advantageously, such device servers 132, 135, and 140 enable a particular device to be replaced in the automated home with a similar, but still different device. When, for example, television 117 is updated with a newer model of a different brand, device server B 135 presents non-device-specific abstracted device data to PC 107 over home automation network 102. The automated home can thereby continue to operate without interruption and without requiring any software to be upgraded on the PC 107 as might otherwise be necessary if server B 135 were not utilized.

The software objects used to provide the abstracted representation of a device to the home automation network 102 are also optionally arranged in a dynamic manner. In this arrangement, the software object types and structure are able to change while home automation network 102 including device servers 132, 135 and 140, is running. As a result, the operational state of the device (for example, whether it is turned on or off) can change and the state change is represented in the software object held in the corresponding device server.

When PC 107 (or other devices or systems) queries the device server for device status, the software object will reflect the latest state of the device.

FIG. 2 is a diagram of an illustrative arrangement in which an automated home 200 is coupled to a communications network 207. Automated home 200 includes the devices shown in FIG. 1 including thermostat 114, television 117 and garage camera 120 that are networked as shown in FIG. 1 and described in the accompanying text.

Although FIG. 2 shows an illustrative home setting, it is emphasized that the present arrangement is applicable a wide variety of setting and environments. Networks that include elements or devices for which remote control is desired or necessary are routinely found in office, commercial, professional, academic and industrial settings, and can take advantage of the features provided by messaging-based control arrangements shown and described herein.

Communications network 207 facilitates communicative relationships between the automated home and remote entities including a cellular network base station 225 and terminal 232. Communications network 207 is selected from one of a variety of conventional networks including the Internet, a private network, public network or combination thereof. Communications network 207 is used in this illustrative example to access IM services and communicate instant messages between the automated home and the remote device. A variety of public IM service providers exist today that may be used to provide the required IM service which are often provided free of charge. Most major IM services are accessible through the Internet.

In most applications, in addition to setting up an account with an IM service provider, an IM client application is required at each network endpoint to facilitate communication using IM. IM client applications are typically specific to each class of device (i.e., mobile phones versus personal computer), but a wide variety of devices are now supporting IM.

IM is different from regular E-mail because communications in IM occur very quickly (if not quite instantly) to enable conversation in written form (commonly called "chat") in real-time. Most IM users use and treat IM chat sessions more like telephone communication than E-mail because of this real-time feature.

An additional difference from E-mail is that virtually all public IM service providers enable a presence information feature that indicates whether any in a user's list of contacts stored by the IM client are online and available to chat using IM. The term "Buddy List" is used in AOL Instant Messenger and Yahoo!Messenger, whereas the term "Contact List" is used in MSN Messenger and ICQ.

The more precise term for a contact is "presentity" which is defined as an entity whose presence (i.e., availability) is tracked by the IM service provider. Accordingly, IM service is often referred to as presence-based communications. To engage in an IM chat session, a presentity must typically sign on to the service by registering its status, location, and other attributes with the IM service provider's registrar (i.e., presence) server.

In FIG. 2, cellular network base station is arranged to facilitate access by a mobile phone 240 to communications network 207 to enable mobile phone 240 to engage in an IM chat session with automated home 200. It is emphasize that mobile phone 240 is merely illustrative and other electronic devices which support IM are also useable in the present arrangement. Such devices include personal digital assistants, pocket PCs, pagers and the like.

Terminal 232 is arranged to participate in an IM chat session with the automated home 200. Terminal 232 is selected from a variety of devices that support IM including personal computers, laptop computers, terminal devices, tablet PCs and other electronic devices that are capable of hosting an IM client.

Figure 3:
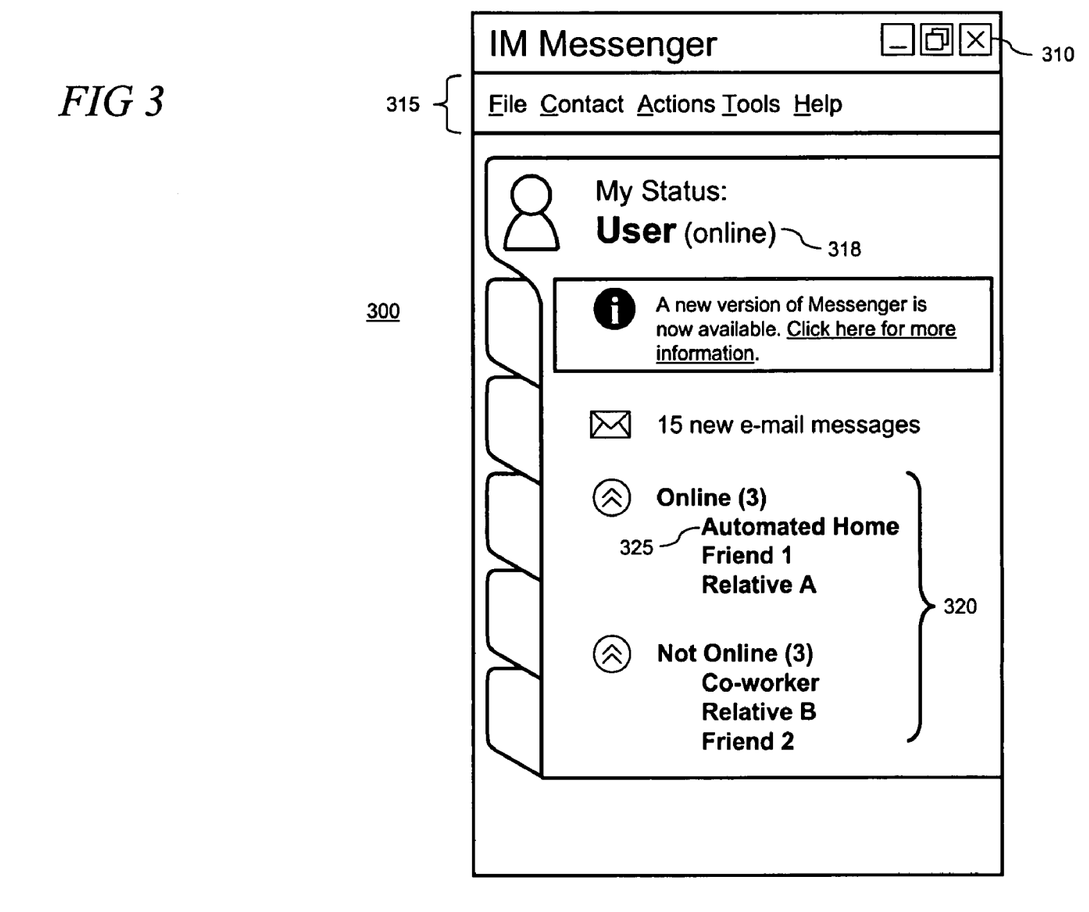
FIG. 3 is an illustrative graphical user interface window provided from an instant messaging ("IM") client showing an IM contact list that includes an automated home as one of the contacts.

FIG. 3 is an illustrative graphical user interface ("GUI") window 300 provided from an IM client named "IM Messenger." GUI window 300 is representative of a typical user interface as seen in many of the IM clients supplied by the major IM service providers. GUI window 300 includes the typical window controls 310 for closing, sizing and minimizing the GUI window, and pull-down menus 315. GUI window 300 is what is displayed by an IM client for a user named "User" (as indicated by reference numeral 318 in FIG. 3). An IM contact list 320 is also shown in GUI window 300 which includes an automated home 325 as one of the contacts.

As shown in the GUI window 300, user 318 is "online" meaning that user 318 is a presentity that is signed on and recognized by the IM service. User 318 is thus able to select and then send instant messages to contacts that are also online. User 318 has three contacts (Automated Home 325, Friend 1 and Relative A) that are currently online and three contacts (Co-worker, Relative B, and Friend 2) that are currently offline.

GUI window 300 is typically refreshed periodically, for example to reflect when contacts in the contact list 320 go online and offline over time. While the names of the contacts used in FIG. 3 are made up for this illustrative example, it should be noted that names which comprise a contact or buddy list are often provided as "screen names" or as email addresses that may not correspond to the real name of the actual person represented by the contact.

The Automated Home contact 325 is utilized by user 318 to communicate with automated home 200 (FIG. 2) via home automation network 102 (FIG. 1) using IM. Accordingly, automated home 200 functions as a presentity on an IM service. To enable such function, one or more IM clients are disposed in home automation network 102. Such IM clients run on PC 107 (FIGS. 1 and 2), or in alternative arrangements, on one or more of the devices connected to home automation 102.

Typically PC 107 hosts an IM client and is arranged with a software agent (often called an "intelligent agent") that interacts with the IM client to send and receive instant messages through the IM service. Many IM clients are regularly integrated into existing software applications such as web browsers and email clients. Accordingly, these IM clients are provided with an application programming interfaces that enable such integration. Other IM clients are available in open source form which support multiple IM service protocols.

Using its agent, PC 107 collects data, status, and state information from devices on the home automation network 102 which is used for notifications in instant messages or in an IM chat session responsively to instant messages received from a remote user. In some applications of messaging based building control, the IM client and agent are integrated in a single software application.

Figure 4:
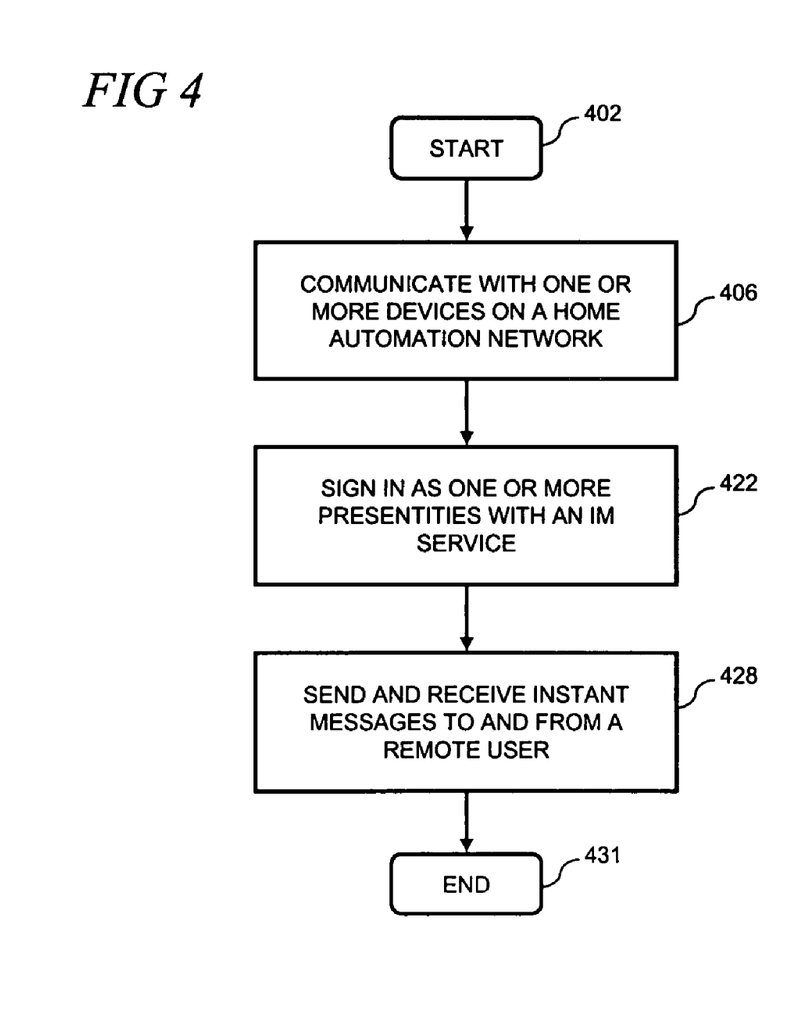
FIG. 4 is a flowchart for an illustrative process used to present an automated home as a contact that may be accessed using IM.

The process described above used to represent the automated home 200 (FIG. 2) as an IM contact is shown in FIG. 4. The process starts at block 402. At block 406, communication is established with one or more of the devices on home automation network 102 (FIG. 1). At block 422, the software agent signs the automated home in with the IM service using the IM client. More than one presentity can be used in this step. For example, one presentity is used to represent the entire home automation network 102 and devices coupled thereto, or alternatively, each device on the network may be represented as a separate presentity. Once recognized as a presentity, the automated home 200 is capable of exchanging instant messages with other presentities using the IM service, including the user 318 (FIG. 3) that is located remotely from the automated home, as indicated in block 428. The process ends at block 431.

Figure 5:
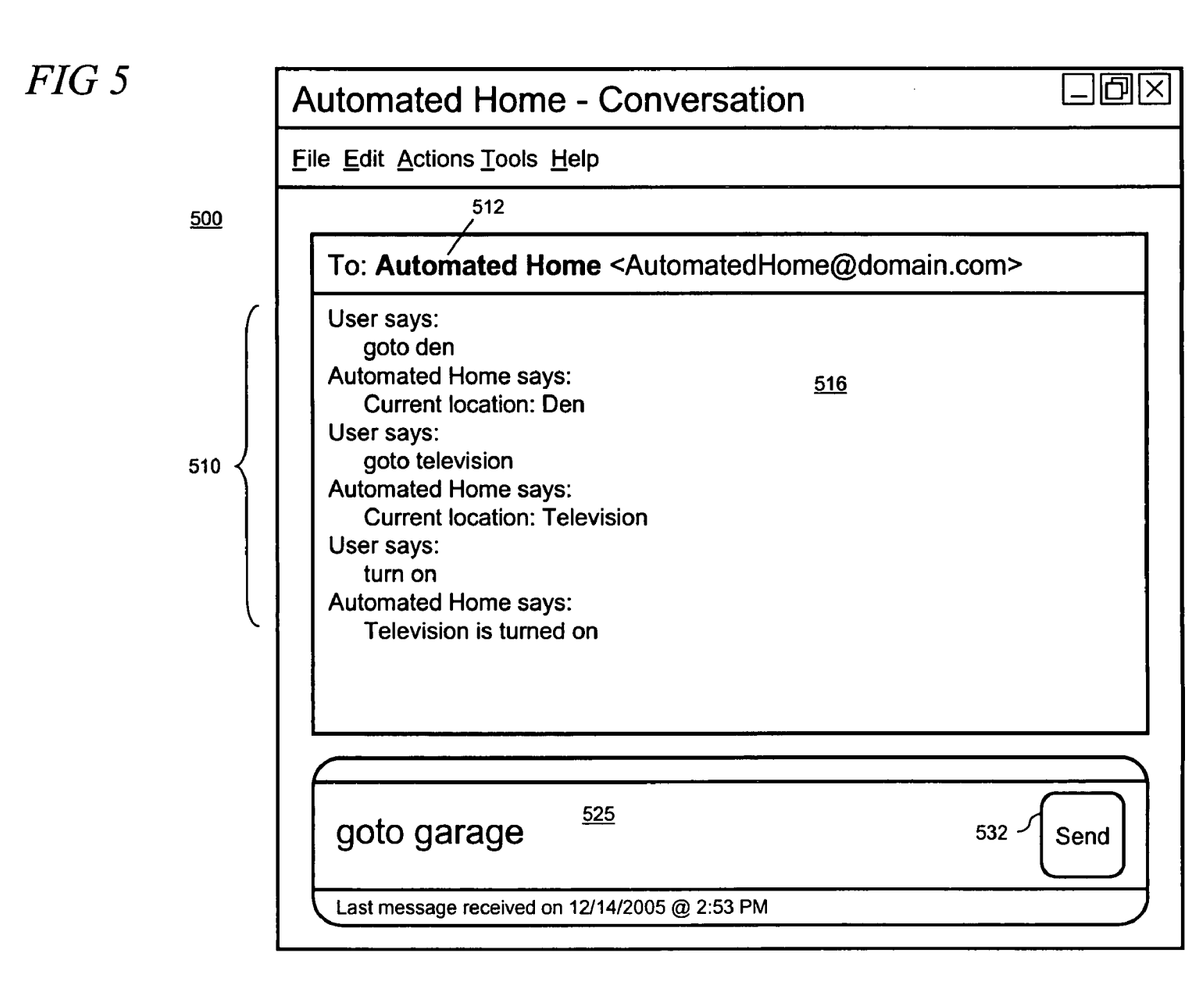
FIG. 5 is an illustrative graphical user interface window provided from an IM client showing a chat session between a user and an automated home.

FIG. 5 is an illustrative GUI window 500 provided from an IM client showing a chat session between the user 318 (FIG. 3) and the automated home 200 (FIG. 2). In this illustrative example, the IM client is hosted from a device that is located remotely from the automated home 200, such as remote terminal 232 or mobile phone 240 (FIG. 2).

GUI window 500 is arranged to show multiple lines of chat 510 between the user and the contact selected from the GUI window 300 shown in FIG. 3. In this illustrative example, the selected contact is automated home contact 512 which has an associated E-mail address as shown.

The user 318 (e.g., using terminal 232 or mobile phone 240) converses with the automated home contact 512 using instant messages to navigate from room to room in the automated home 200. A running transcript of the chat session is displayed on GUI 500 in a conversation window 516 with each new instant message being displayed after earlier messages at the bottom of the lines of chat.

GUI window 500 is arranged with a message entry window 525 where the user types an instant message and sends to the automated home 200 by pressing the send button 532. As shown in FIG. 5, user 318 is intending to send the instant message which includes the command "goto garage."

The interaction with automated home 200 is preferably implemented using natural language type commands (e.g., goto, turn on) that allow the user 318 to navigate through the home and make changes to it as desired. Such natural language commands set are well known and were developed, in part, for computer command-line/text-based role playing games that were introduced in the early 1980s. In the present arrangement, the use of natural language command sets provides an effective way to remotely accomplish tasks in the automated home without needing to learn a new and complex interface.

Figure 6:
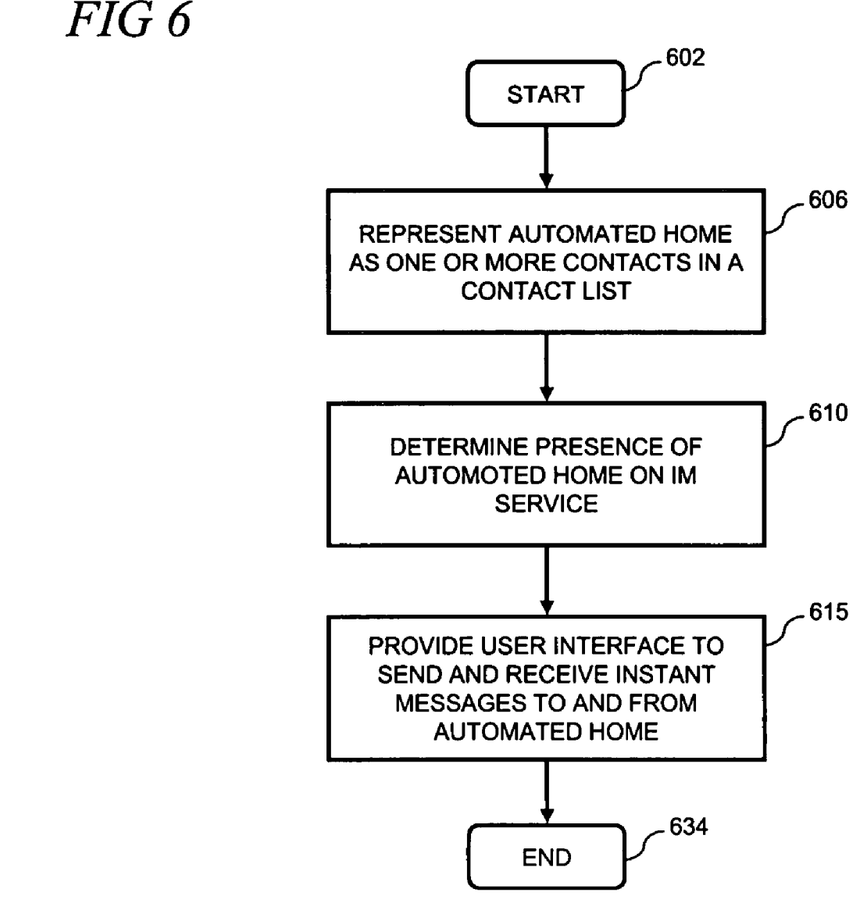
FIG. 6 is a flowchart for an illustrative process used by an IM client to facilitate IM communication between a user and an automated home.

FIG. 6 is a flowchart for an illustrative process used by an IM client to facilitate IM communication between the user 318 (FIG. 3) and an automated home 200 (FIG. 2). The process starts at block 602. At block 606, the IM client represents the automated home 200 in a GUI window as one of the contacts available to participate in a chat session. Next, at block 610, the IM client checks for the presence of the automated home 200 on the IM service so that it may be contacted using IM. An interface for the user 318 is provided at block 615 so that the user 318 can send instant messages to the automated home 200 when it is online and also receive instant messages from the automated home 200.

Figure 7:
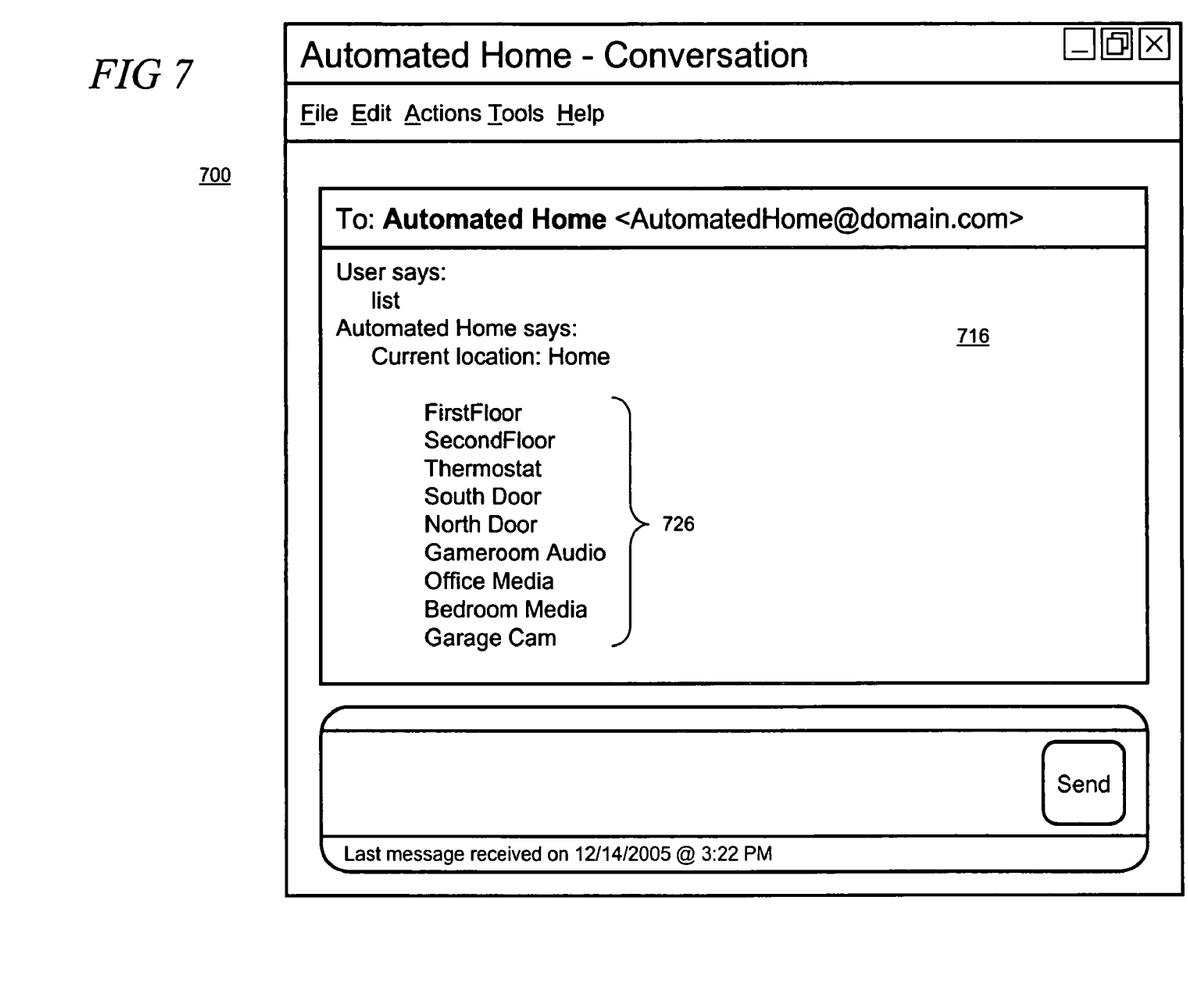
FIG. 7 is an illustrative graphical user interface window provided from an IM client showing a list of devices and zones in an automated home.

FIG. 7 is an illustrative GUI window 700 provided from an IM client showing a list of devices and zones 726 in the automated home 200 (FIG. 2). GUI window 700 is an example of the capability of the present arrangement to list devices and zones which can be addressed for monitoring and commanding, or for walk through.

Areas of the automated home 200 (e.g., FirstFloor, SecondFloor) are listed as objects, as well as particular devices such as the thermostat 114 and garage camera 120 in the messaging window 716. User 318 (FIG. 3) is thus able to go to particular locations in the automated home 200 to both monitor objects as well as operate or adjust them (for example, turning on a dishwasher, adjusting the temperature on a thermostat, checking that a door is closed, etc.).

The automated home 200 responds to queries and commands from the user 318 using instant messages containing natural language. Such responses can preferably include indications when certain commands from the user 318 cannot be recognized or are not applicable to a particular device. For example, an instant message seeking to make an adjustment to a device that only has binary states (i.e., on and off) would be met with a responsive instant message stating that such adjustment cannot be made. Similarly, a response might state that a light is already turned on in response to an instant message from user 318 requesting that the light be turned on.

Figure 8:
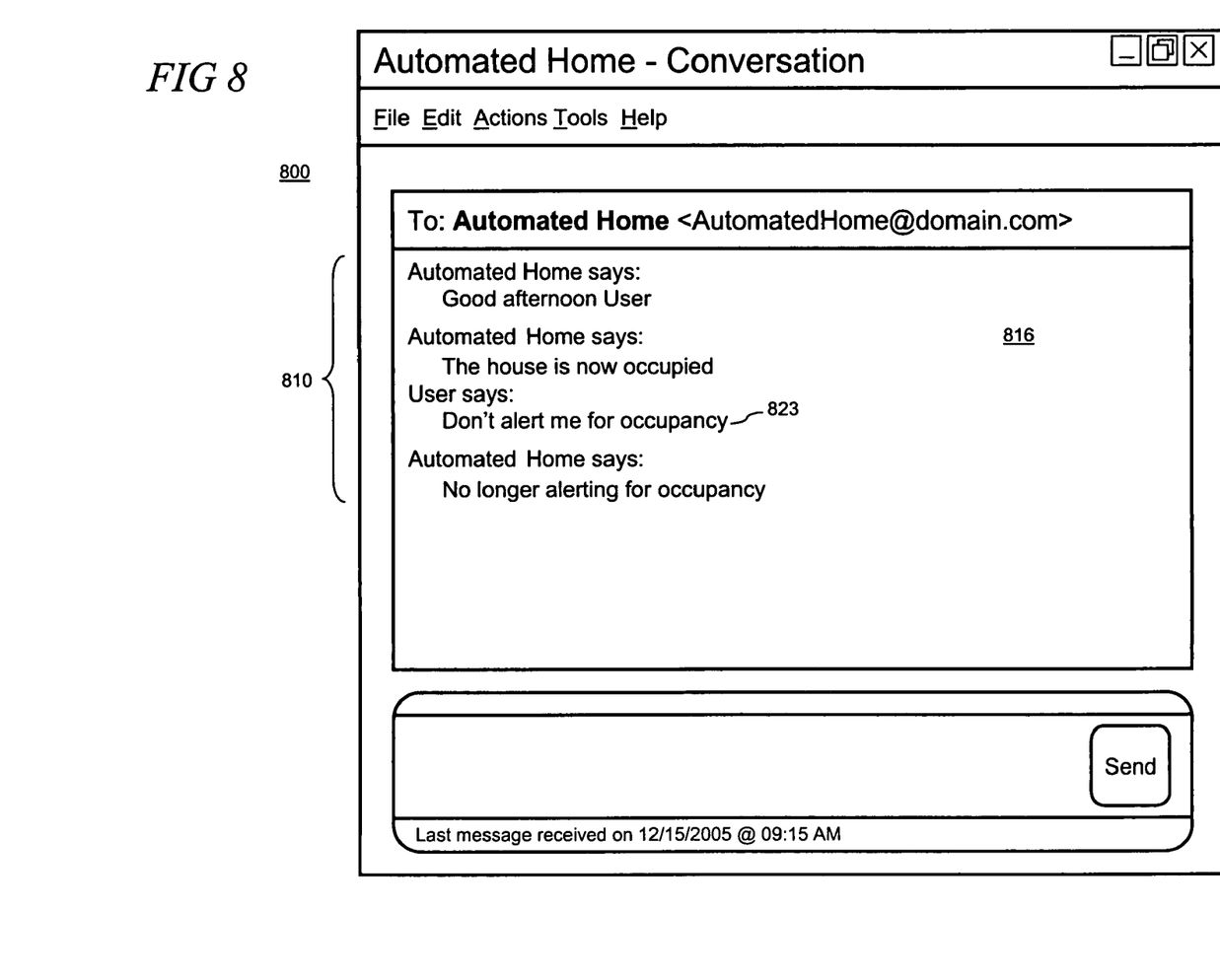
FIG. 8 is an illustrative graphical user interface window provided from an IM client showing a notification received from an automated home.

FIG. 8 is an illustrative GUI window 800 provided from an IM client showing a notification received from the automated home 200 (FIG. 2) that is used to indicate the status of the automated home 200. In the illustrative notification contained in chat 810 in messaging window 816, the user is informed that the automated home 200 is occupied. The automated home 200 determines that it is occupied based on sensors associated with a security system, or lights/appliances being turned on or off, for example. The automated home 200 is enabled to detect such state changes. In the optional arrangement using device servers 132, 135 and 140, the detected state changes are reflected in the appropriate software objects as described above in the text accompanying FIG. 1 and reported in an IM notification to the user 318.

As indicated by the instant message text 823, the user 318 (FIG. 3) is able to issue a natural language command to have automated home 200 stop sending occupancy notifications. This reduces instant messages from the automated home 200 that the user 318 might find as being redundant or unnecessary. This could occur, for example, because the user 318 has concluded that an authorized person has entered the automated home 200.

Various networking protocols may be used to implement the home automation network 102 shown in FIG. 1 depending on the specific requirements of an application of automated home control. These networking arrangements include Ethernet, wireless Ethernet, IEEE 802.11 (Institute of Electrical and Electronic Engineers), HomePlug, Wi-Fi, Bluetooth, Zigbee, Wireless USB, powerline, phoneline, X10, HomePNA, Z-wave and UPB (universal powerline bus) protocols.

Various devices may be used with the home automation network 102 shown in FIG. 1 depending on the specific requirements of an application of automated home control. These devices include television, media player (such as a compact disc, digital versatile disc), sound system (such as stereo systems), home theater, thermostat, climate control system, HVAC, door sensor, window sensor, automobile, telephone, telephone answering machine, appliance, furnace, hot water heater, fireplace, set top box, digital video recorder, smoke detector, heat detector, motion detector, carbon monoxide detector, personal computer, lights, radio, security camera, garage door opener, intercom and security system.

Each of the processes shown in FIGS. 4 and 6 may be implemented in a general, multi-purpose or single purpose processor. Such a processor will execute instructions, either at the assembly, compiled or machine-level, to perform that process. Those instructions can be written by one of ordinary skill in the art following the description of FIGS. 4 and 6 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The invention claimed is:

1. A computer-readable medium encoded with instructions which, when performed by a processor, performs a method comprising:
  communicating with one or more devices linked to a home automation system in a home;
  signing in as one or more presentities with a registrar server in an IM service; and
  participating in a chat session facilitated by the IM service to exchange instant messages between a user and the home automation system wherein the chat session allows a user to navigate through the home.

2. The computer-readable medium of claim 1 wherein the one or more devices is selected from one of television, media player, sound system, home theater, thermostat, climate control system, HYAC, automobile, telephone, telephone answering machine, appliance, furnace, hot water heater, fireplace, set top box, door sensor, window sensor, digital video recorder, smoke detector, heat detector, motion detector, carbon monoxide detector, personal computer, lights, radio, security camera, garage door opener, intercom and security system.

3. The computer-readable medium of claim 1 wherein the instant messages include one of control information and device status information.

4. The computer-readable medium of claim 3 wherein the control information is used for operating the one or more devices.

5. The computer-readable medium of claim 4 wherein the operating is selected from one of turning on, turning off, adjusting, monitoring, controlling, setting, selecting, querying, opening, closing, enabling, disabling, programming, rebooting and repairing.

6. The computer-readable medium of claim 1 wherein the navigation in the chat session enables a virtual walk through of a home in which the home automation system is provided.

7. The computer-readable medium of claim 1 wherein the instant messages includes natural language.

8. The computer-readable medium of claim 1 in which instant messages generated by the home automation network are in human-readable form.

9. The computer-readable medium of claim 1 further including enabling representation of the one or more presentities as contacts or buddies on a user interface presented by an IM client.

10. The computer-readable medium of claim 9 wherein the IM client operates on an electronic device selected from one of mobile phone, smart phone, personal digital assistant, personal computer and laptop computer.

11. The computer-readable medium of claim 1 wherein the one or more devices are coupled to device servers to enable the one or more devices to be provided as an abstracted representation to the processor.

12. The computer-readable medium of claim 11 wherein the abstracted representation is created using a dynamically distributed software object model.

13. The computer-readable medium of claim 1 wherein the communicating with the one or more devices is performed using a communications protocols selected from one of Ethernet, wireless Ethernet, IEEE 802.11, HomePlug, Wi-Fi, Bluetooth, Zigbee, Wireless USB, powerline, phoneline, X10, HomePNA, Z-wave and UPB protocols.

14. A home automation system controller, comprising:
  a network interface for connecting to one or more devices on a home automation network wherein the one or more devices on the home automation network are located in a home;

a processor coupled to the network interface for monitoring a state of the one or more devices;

a local IM client running on the processor for sending instant messages which describe the state of the one or more devices to a remote IM client using an IM service and allow a user of the remote IM client to navigate through the home.

15. The home automation system controller of claim 14 in which the processor is arranged to send operating commands to the one or more devices responsively to instant messages received from the remote IM client.

16. The home automation controller of claim 14 wherein the home automation network includes one or more device servers in operative communication with respective ones of the one or more devices.

17. The home automation controller of claim 16 wherein the processor is responsive to at least one software object on the one or more servers to enable the monitoring to be performed dynamically.

* * * * *

UNITED STATES PATENT AND TRADEMARK OFFICE
CERTIFICATE OF CORRECTION

| | | |
|---|---|---|
| PATENT NO. | : 7,403,838 B2 | Page 1 of 1 |
| APPLICATION NO. | : 11/302777 | |
| DATED | : July 22, 2008 | |
| INVENTOR(S) | : Deen et al. | |

It is certified that error appears in the above-identified patent and that said Letters Patent is hereby corrected as shown below:

In Fig. 6, Sheet 6 of 8, for Tag "610", Line 2, please delete "AUTOMOTED" and replace with --AUTOMATED--

Signed and Sealed this

Eighteenth Day of August, 2009

David J. Kappos
*Director of the United States Patent and Trademark Office*